(12) United States Patent
Patterson

(10) Patent No.: US 11,014,622 B1
(45) Date of Patent: May 25, 2021

(54) RETRACTABLE COVER SYSTEMS

(71) Applicant: Kyle Patterson, Portland, OR (US)

(72) Inventor: Kyle Patterson, Portland, OR (US)

( * ) Notice: Subject to any disclaimer, the term of this patent is extended or adjusted under 35 U.S.C. 154(b) by 120 days.

(21) Appl. No.: 16/450,584

(22) Filed: Jun. 24, 2019

Related U.S. Application Data

(60) Provisional application No. 62/836,374, filed on Apr. 19, 2019, provisional application No. 62/736,720, filed on Sep. 26, 2018.

(51) Int. Cl.
*B62J 1/20* (2006.01)

(52) U.S. Cl.
CPC ...................................... *B62J 1/20* (2013.01)

(58) Field of Classification Search
CPC ..... A47C 7/386; A47C 31/113; A47C 31/116; A47C 31/11; B60N 2/60; B62J 1/18; B62J 19/00; B62J 1/20
USPC ..... 297/184.1, 4, 221, 219.1, 219.11, 228.11
See application file for complete search history.

(56) References Cited

U.S. PATENT DOCUMENTS

| | | | | |
|---|---|---|---|---|
| 3,972,539 A | * | 8/1976 | Mize | B62J 19/00 296/78.1 |
| 5,372,169 A | * | 12/1994 | Norton | B62J 19/00 150/167 |
| 5,676,288 A | * | 10/1997 | Spirk | B62J 19/00 150/167 |
| 8,936,313 B2 | * | 1/2015 | Skarvan | B62J 1/20 297/219.11 |
| 2008/0169688 A1 | * | 7/2008 | Funderburg | A61J 9/0615 297/188.06 |
| 2015/0074912 A1 | * | 3/2015 | Simon | A47C 31/113 5/640 |
| 2016/0101820 A1 | * | 4/2016 | Sinn | B62J 1/20 297/219.11 |

FOREIGN PATENT DOCUMENTS

| | | | | | |
|---|---|---|---|---|---|
| CN | 107499428 A | * | 12/2017 | | |
| DE | 9112136 U1 | * | 2/1992 | | B62J 1/18 |
| GB | 191010754 A | * | 3/1911 | | B62J 1/20 |
| GB | 191317655 A | * | 6/1914 | | B62J 1/20 |

* cited by examiner

*Primary Examiner* — Milton Nelson, Jr.
(74) *Attorney, Agent, or Firm* — Small Business Legal Clinic; Jessica Ann Bernardini; Daniel C. Housley

(57) ABSTRACT

A retractable cover system may include a cover adapted to cover an object, a holder, and a retraction cord arranged to pull the cover into the holder when the cover is not in use, wherein the cover, the holder and the retraction cord are arranged to cause the cover to collapse as it is pulled into the holder. The cover may include a retraction channel, and the holder may include a storage sleeve. The retraction channel may be arranged to collapse the cover in response to pulling the retraction cord by gathering the cover as the cover is pulled into the storage sleeve by the retraction cord.

19 Claims, 10 Drawing Sheets

RETRACTABLE COVER SYSTEMS

CROSS-REFERENCE TO RELATED APPLICATIONS

This application claims priority from U.S. Provisional Patent Application Ser. No. 62/836,374 filed Apr. 19, 2019 which is incorporated by reference. This application also claims priority from U.S. Provisional Patent Application Ser. No. 62/736,720 filed Sep. 26, 2018 which is also incorporated by reference.

BACKGROUND

Outdoor gear is frequently exposed to environmental hazards such as dirt, wind, precipitation, etc. Some components of outdoor gear such as seats on bicycles and other vehicles, optic sights for hunting gear, etc., need protection from such environmental hazards. Currently available covers may provide adequate protection but are inconvenient use.

SUMMARY

Some of the inventive principles of this patent disclosure are directed to a retractable cover system including: a cover adapted to cover an object, wherein the cover includes a retraction channel; a storage sleeve arranged to receive the cover when not in use; and a retraction cord coupled between the cover and the storage sleeve and arranged to move within the retraction channel. The retraction channel may be arranged to collapse the cover in response to pulling the retraction cord. The cover, retraction channel and retraction sleeve may be arranged to gather the cover as the cover is pulled into the storage sleeve by the retraction cord. The retraction channel may have a first end that is open to receive the retraction cord and a second end opposite the first end. The retraction cord may have a first end that is attached to the cover at or near the second end of the retraction channel. The storage sleeve may include an opening; and the retraction cord may pass through the opening. The retraction cord may have a first end that is attached to the cover at or near the second end of the retraction channel; and the retraction cord may have a second end that is attached to the storage sleeve. The system may further include a tab arranged to slide along the retraction cord. The storage sleeve may be adapted to be affixed to a structure in proximity to the object to be covered by the cover. The storage sleeve may include one or more straps to attach the storage sleeve to a bicycle seat.

Some additional inventive principles of this patent disclosure are directed to a method including: removing a cover from an object; pulling the cover into a holder by pulling a retraction cord attached to the cover; and collapsing the cover as it is pulled into the holder. Collapsing the cover may include gathering the cover. Gathering the cover may include pulling the retraction cord through a retraction channel on the cover. Pulling the retraction cord may include pulling the retraction cord through an opening in the holder. The method may further include holding the retraction cord out of the way with a tab when the cover is in the holder.

Some additional inventive principles of this patent disclosure are directed to a system including:
a cover adapted to cover an object; a holder; and a retraction cord arranged to pull the cover into the holder when the cover is not in use; wherein the cover, the holder and the retraction cord are arranged to cause the cover to collapse as it is pulled into the holder. The cover may include a retraction channel; the retraction cord may pass through the retraction channel; and the retraction cord may collapse the cover as it pulls the cover into the holder. The retraction cord may collapse the cover by gathering the cover.

DETAILED DESCRIPTION

FIGS. 1A through 1D illustrate an embodiment of a retractable cover system according to some of the inventive principles of this patent disclosure. The embodiment of FIGS. 1A through 1D includes a cover 100 and a holder 102 that holds the cover when the cover is not in use. A retraction cord 104 is coupled to the cover 100 and holder 102 and arranged to pull the cover into the holder in way that causes the cover to collapse as it is pulled into the holder.

Figure 1A:
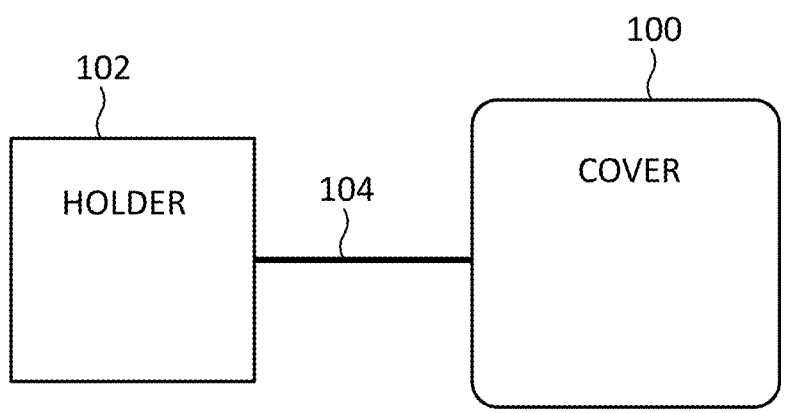
FIGS. 1A through 1D are schematic diagrams of an embodiment of a retractable cover system according to some of the inventive principles of this patent disclosure.
Figure 1B:
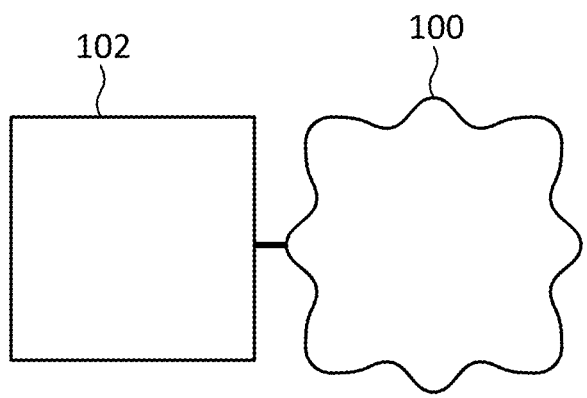
Figure 1C:
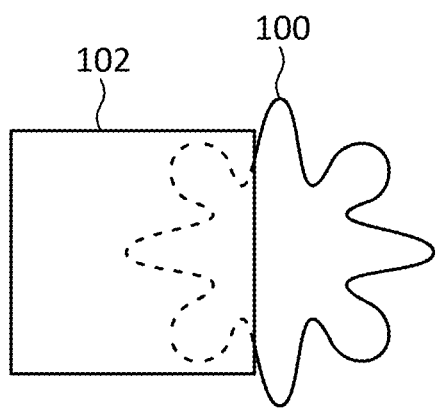
Figure 1D:
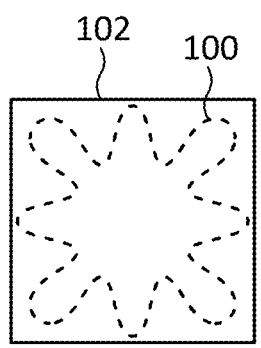

FIG. 1A shows the cover 100 in a fully deployed position. FIG. 1B shows the cover 100 beginning to collapse as it is pulled into the holder 102. FIG. 1C shows the cover mostly collapsed and pulled partially into the holder. FIG. 1D shows the cover fully collapsed and pulled all the way into the holder.

The details of the operation and construction of the embodiment of FIGS. 1A through 1D may vary depending on the specific implementation. For example, in some embodiments, the cover 100 may not begin collapsing until it makes contact with the holder 102. As another example, the cover 100 may protrude partly from the holder 102 when it is fully retracted rather than being fully enclosed as shown in FIG. 1D.

Figure 2:
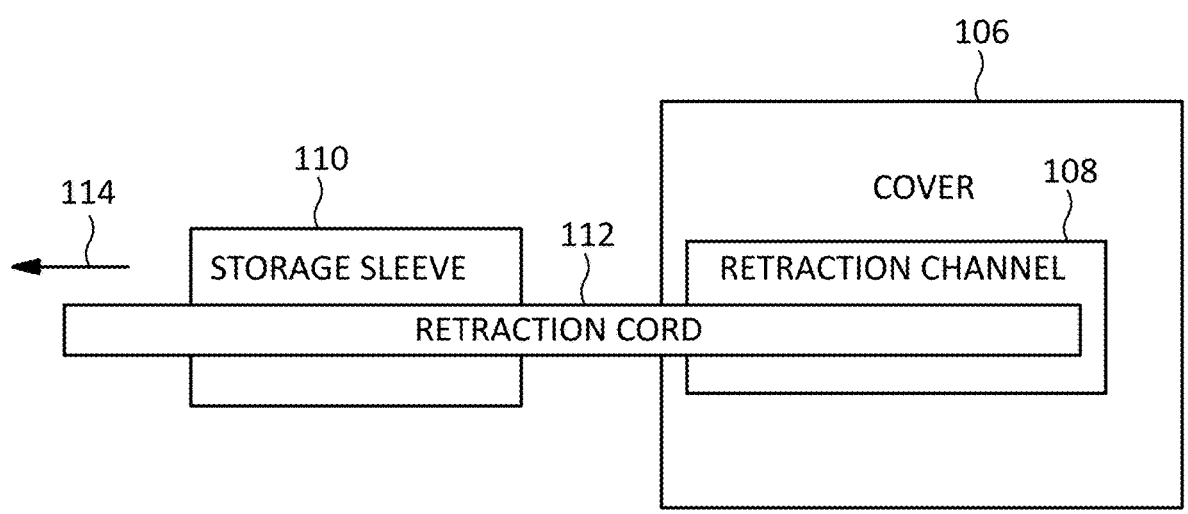
FIG. 2 is a schematic diagram of another embodiment of a retractable cover system according to some of the inventive principles of this patent disclosure.

FIG. 2 illustrates another embodiment of a retractable cover system showing some possible implementation details according to some of the inventive principles of this patent disclosure. In the embodiment of FIG. 2, the cover 106 includes a retraction channel 108, and the holder is implemented as a storage sleeve 110. The retraction cord 112 passes through the storage sleeve and the retraction channel and is arranged to collapse the cover and pull it into the storage sleeve in response to a user pulling the retraction cord as shown by arrow 114.

Figure 3:
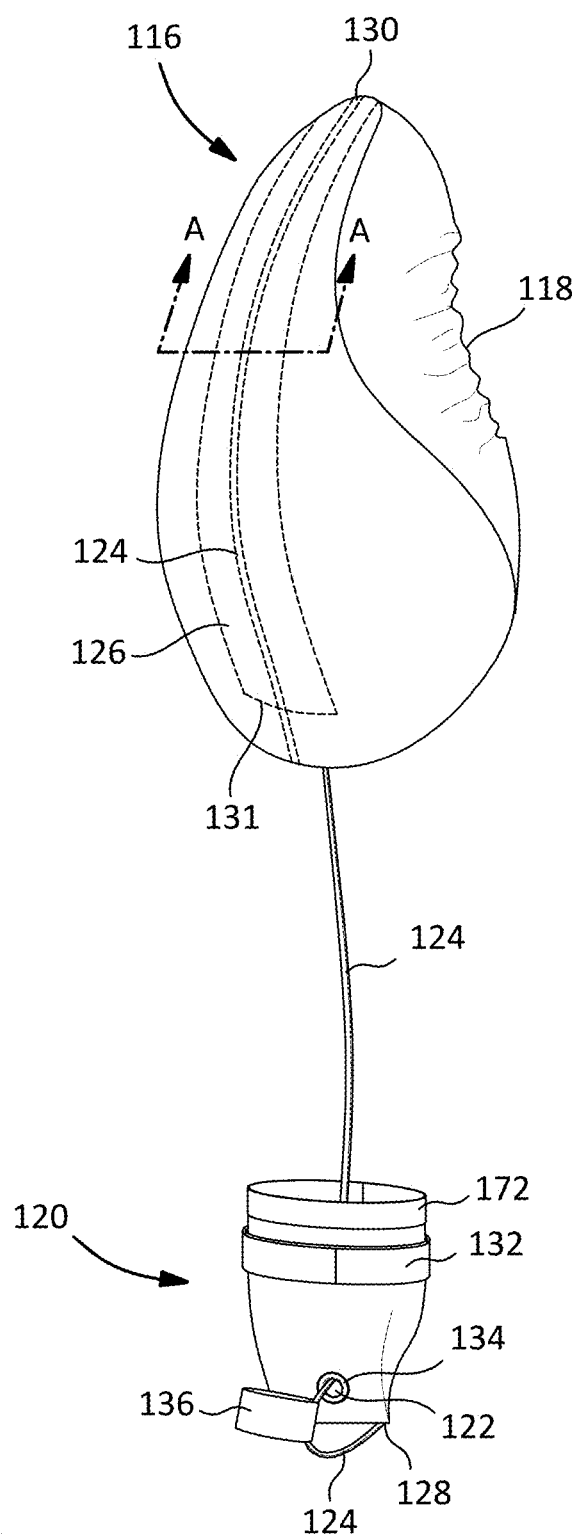
FIGS. 3 through 5 are perspective views illustrating a detailed example embodiment of a retractable cover system according to some of the inventive principles of this patent disclosure.

FIG. 3 illustrates another embodiment of a retractable cover system showing some additional possible implementation details according to some of the inventive principles of this patent disclosure. In the embodiment of FIG. 3, the cover 116 is shaped to fit over a bicycle seat and may include an elasticized hem, drawstring, or other cinching structure 118 to hold the cover in place when it is on the seat. The retraction cord 124 passes through an opening 122 in the storage sleeve 120 and through the retraction channel 126 in the cover 116. One end of the retraction cord 124 is attached to the storage sleeve 120 at anchor point 128, while the other end of the retraction cord is attached to the cover 116 at another anchor point 130 at one end of the retraction channel 126. The retraction cord 124 passes through an opening at the other end 131 of the retraction channel 126. The retraction channel 126 and part of the retraction cord 124 are shown in phantom view with broken lines to indicate that they are located on the inside of the cover 116 and typically would not be visible through the cover.

The storage sleeve 120 may also include one or more straps 132 or other attachment devices to attach the sleeve to the bottom of a bicycle seat or other structure. For example, the straps 132 may be implemented with bands of hook-and-loop fasteners such as Velcro. The opening 122 in the storage sleeve 120 may be protected by a grommet 134. A tab 136 may be attached to, and slide along, the retraction cord 124.

Figure 6:
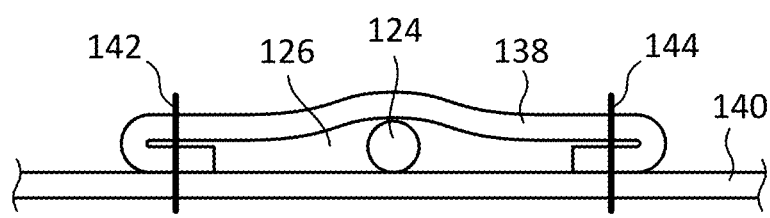
FIGS. 6 and 7 are cross-sectional views of example embodiments of retraction channels according to some of the inventive principles of this patent disclosure.
Figure 7:
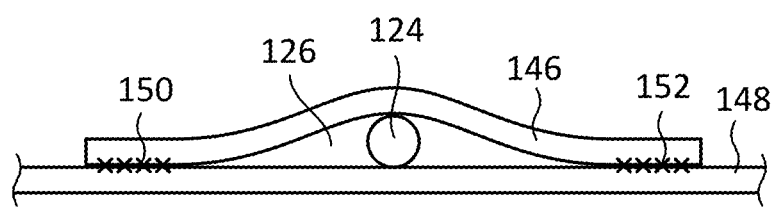

Some possible implementation details for the retraction channel 126 are shown in FIGS. 6 and 7 which are cross-sectional views taken along line A-A in FIG. 3. In the embodiment of FIG. 6, the channel 126 is formed by folding the edges of a piece of channel material 138 and sewing them to base material 140 of the cover 116 with stitching 142 and 144. In the embodiment of FIG. 7, the channel 126 is formed by bonding the edges of a piece of channel material 146 to the base material 148 of the cover 116 using adhesive, thermal, ultrasound and/or other bonding as shown by the x's at locations 150 and 152.

Figure 4:
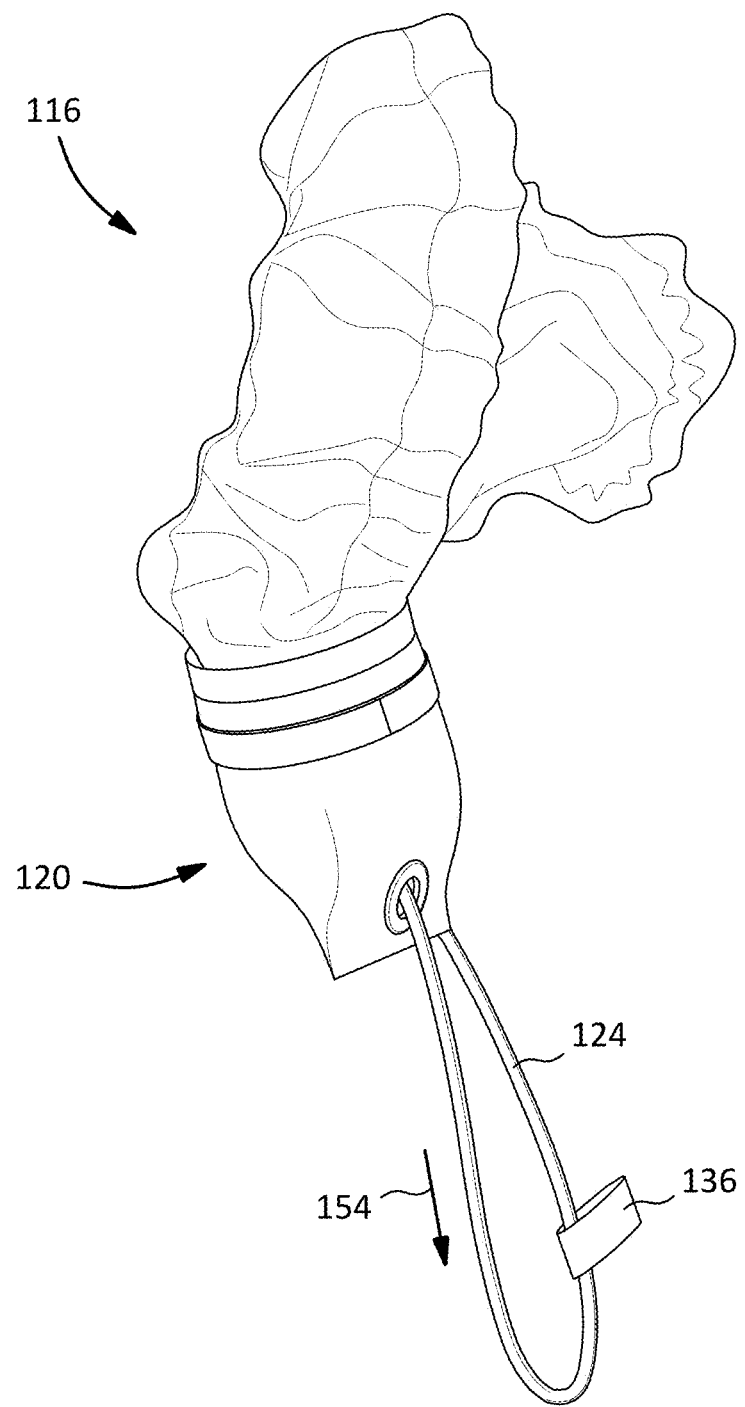

In FIG. 3, the cover 116 is shown in a fully deployed position. FIG. 4 shows the cover 116 partially collapsed as it is being pulled into the storage sleeve 120 by retraction cord 124 as it is pulled as shown by arrow 154. In this embodiment, the retraction cord acts as a drawstring and collapses the cover by gathering it into folds. The user may retract and collapse the cover in various ways including pulling continuously on one point of the retraction cord 124 or on the tab 136, or alternatively pulling on the retraction cord 124 (or the tab 136) at various points (non-continuously) that move progressively along the retraction cord toward the cover as the cord and cover are pulled into the sleeve for better grip and retraction and less pull force.

Figure 5:
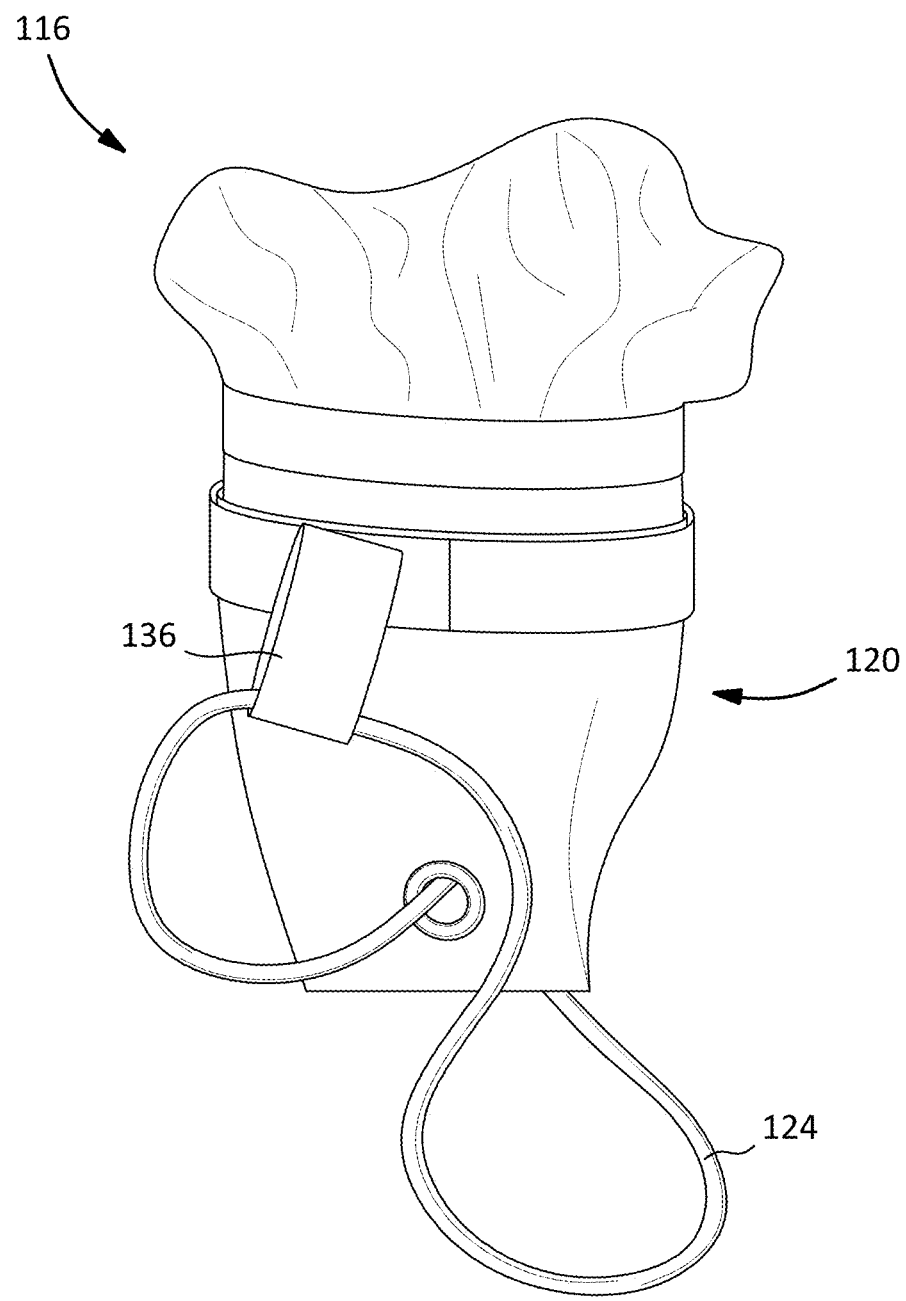

FIG. 5 shows the cover 116 at or near the fully retracted position. Depending on the implementation details, as well as the user's preferences and/or habits, the cover 116 may partially protrude from the storage sleeve 120, as shown in FIG. 5, or it may be pulled completely inside the sleeve. In this position, the tab 136 may be used to help secure the retraction cord 124 out of the way while not in use.

Figure 8:
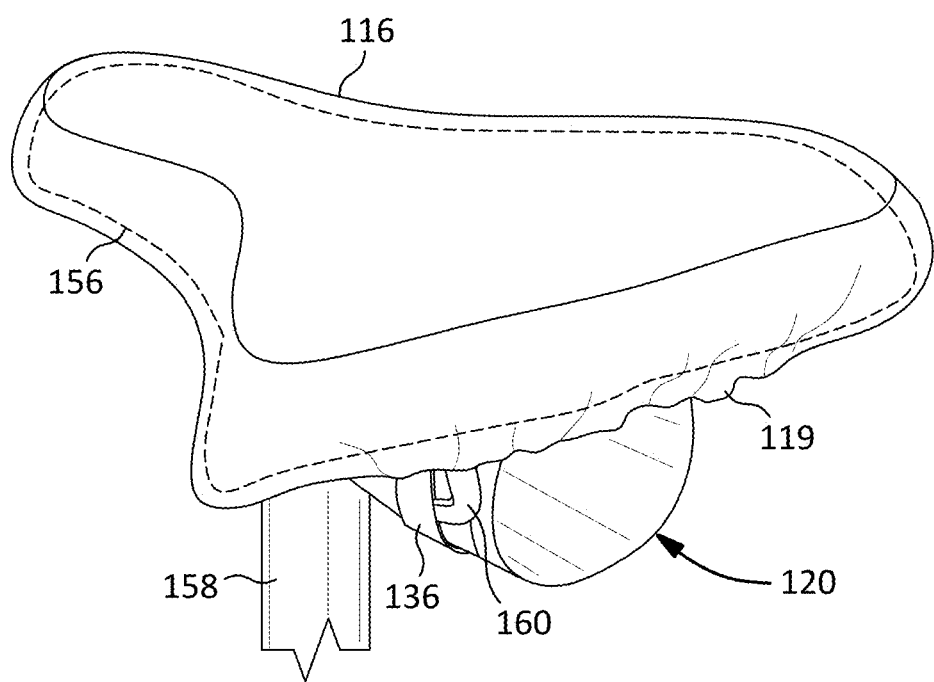
FIGS. 8 and 9 are perspective views illustrating how an embodiment of a cover may be used on a bicycle seat according to some of the inventive principles of this patent disclosure.
Figure 9:
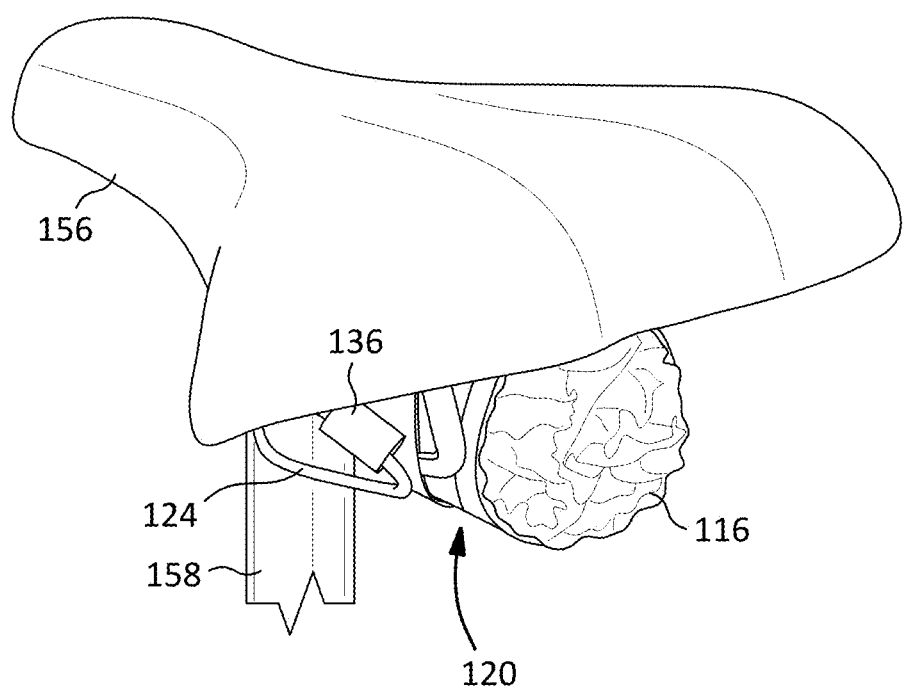

FIGS. 8 and 9 illustrate how the embodiment of FIGS. 3 through 5 may be used on a bicycle seat 156 which is mounted on an upright seat post 158 and which includes support brackets such as bracket 160 which is visible in the views of FIGS. 8 and 9.

In FIG. 8, the cover 116 is in place over seat 156 which is shown in phantom view with broken lines. The storage sleeve 120 is secured under the seat via straps 132 wrapping around support brackets including bracket 160. The retraction cord 124 is not visible because most of it is running the length of the retraction channel in the cover 116 as well as the length of the storage sleeve 120, and the remainder is a short portion extending from the end of the storage sleeve near the seat post 158. Some bunching or gathering 119 of the cover 116 caused by the cinching structure 118 is visible at the rear of the seat.

In FIG. 9, the bicycle seat 156 is now visible because the cover 116 has been removed and collapsed and pulled into the storage sleeve 120. The retraction cord 124 is now visible because most of it has been pulled through the opening 122 in the storage sleeve. The tab 136 may now be used to help hold the retraction cord 124 out of the way, for example, by the user tucking or wedging the tab into any suitable place under the seat.

Figure 10:
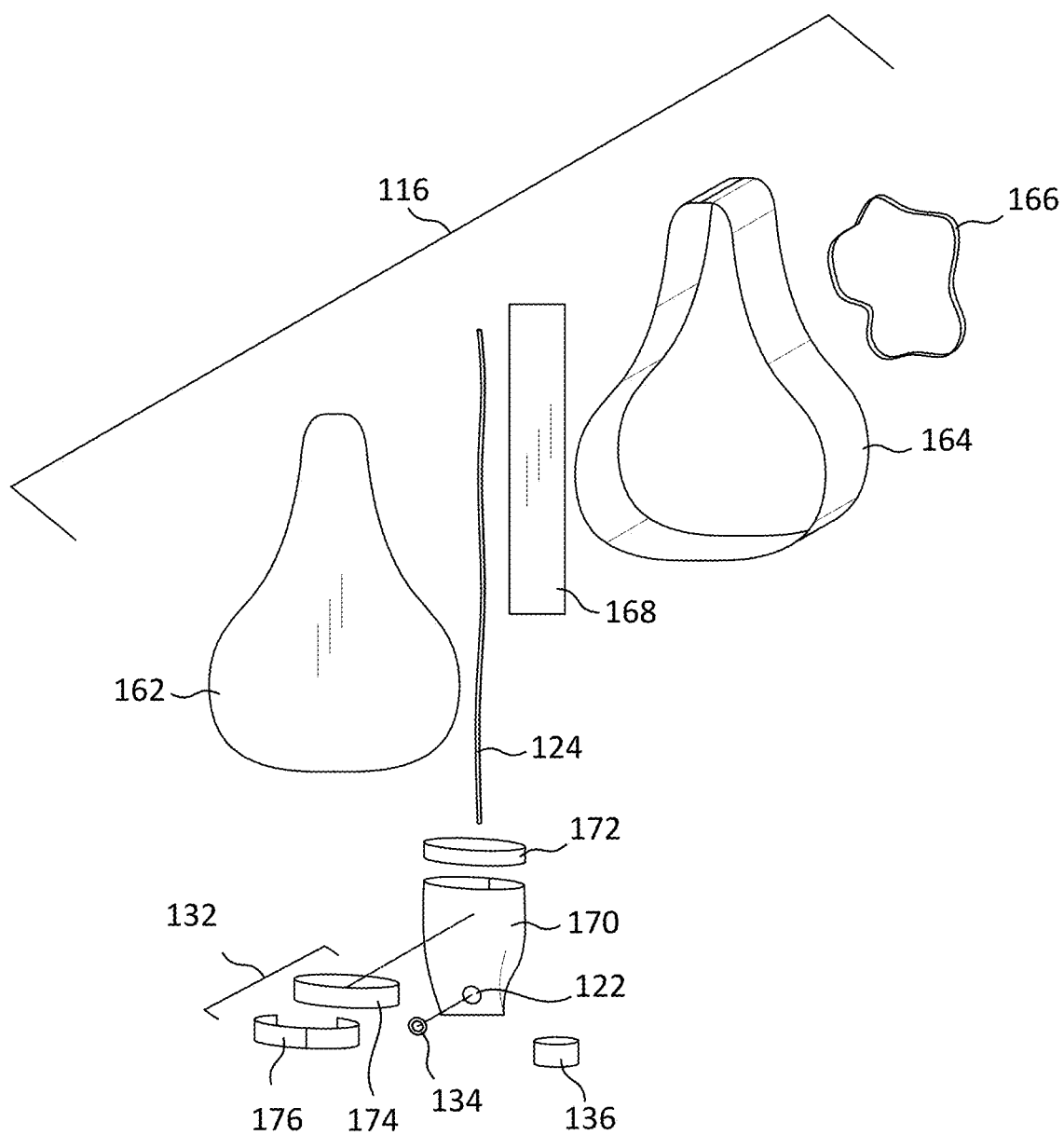
FIG. 10 is an isometric exploded view of example components that may be used to implement an embodiment of a retractable cover system according to some of the inventive principles of this patent disclosure.

FIG. 10 is an exploded view illustrating some examples of components that may be used to implement the embodiment of FIGS. 3-5. The cover 116 may include a top panel 162 and a side panel 164 which may be fabricated from any suitable material. Examples include lightweight and waterproof nylon, polyester, TPU, wool, oilcloth, or any other non-woven or woven material that may be coated to make it waterproof. A stretch band 166, which may be made from an elastomer or other stretchable material may be directly attached to the bottom edge of the side panel 164 or sewn into a gathering hem at the bottom of the side panel. Another panel 168 may be used to form the retraction channel 126, for example, as the channel material 138 or 146 in FIGS. 6 and 7, respectively. The panel 168 may be made from the same material as the top panel 162 or any other suitable material.

The retraction cord 124 may be fabricated from any elongated piece or assembly of material including thread, strap, chain, cable, string, rope, wire, etc. The retraction cord 124 may or may not be stretchable depending on the implementation details. In some embodiments, the cord may be fabricated from an elastic cord with a rubber core and polyester casing.

The storage sleeve 120 may include a body 170 made from any suitable material. In one example embodiment, the body 170 is fabricated from a hydrophobic mesh material such as polyester or nylon which may allow moisture that was on the cover to drain from the sleeve when the cover is pulled into the sleeve. If the material used for the body is semi-rigid, it may hold its shape to enable the storage sleeve to receive the retracted cover. The shape of the storage sleeve may be adjusted to fit a diverse range of attachment locations. The body 170 may be sewn, glued or otherwise assembled with folds or tucks to make it narrower at the closed end to provide a tapered or funnel shape as is visible in FIGS. 3 through 5. This may keep the open end wider to facilitate pulling the cover into the sleeve. An opening band 172 provides a finished edge to the opening of the storage sleeve 120, and if made from a relatively rigid material, it may prevent the opening of the sleeve from collapsing during use, thereby making it easier to pull the cover into the sleeve. Alternatively, the body 170 of the storage sleeve may be made from a relatively rigid mesh or other material to prevent it from collapsing during operation. Making the open end more rigid may also facilitate collapsing the cover if it engages rim at the open end of the sleeve or other type of holder as it is pulled into the holder as illustrated in FIG.

1D. This may be especially helpful in an embodiment that does not include a retraction channel.

The straps 132 may include an inner portion 174 attached directly to the body 170 of the storage sleeve 120 and an outer portion 176 that may wrap around any suitable attachment structure and connect back to the inner portion 174 in any suitable manner. In some embodiments, the inner and outer portions may be fabricated from the loop part and the hook part, respectively, (or vice-versa) of a hook-and-loop fastener. In some other embodiments, the straps 132 may be secured with snaps, hooks, clips, etc., in which case the inner portion may be omitted and the fasteners attached directly to the body 170. The grommet 134 that protects hole 122 and/or facilitates passage of the retraction cord 124 may be fabricated from plastic, brass, stainless steel, or any other suitable material. The tab 136 may be fabricated from any suitable material such as molded plastic or rubber, sewn fabric, etc.

Figure 11:
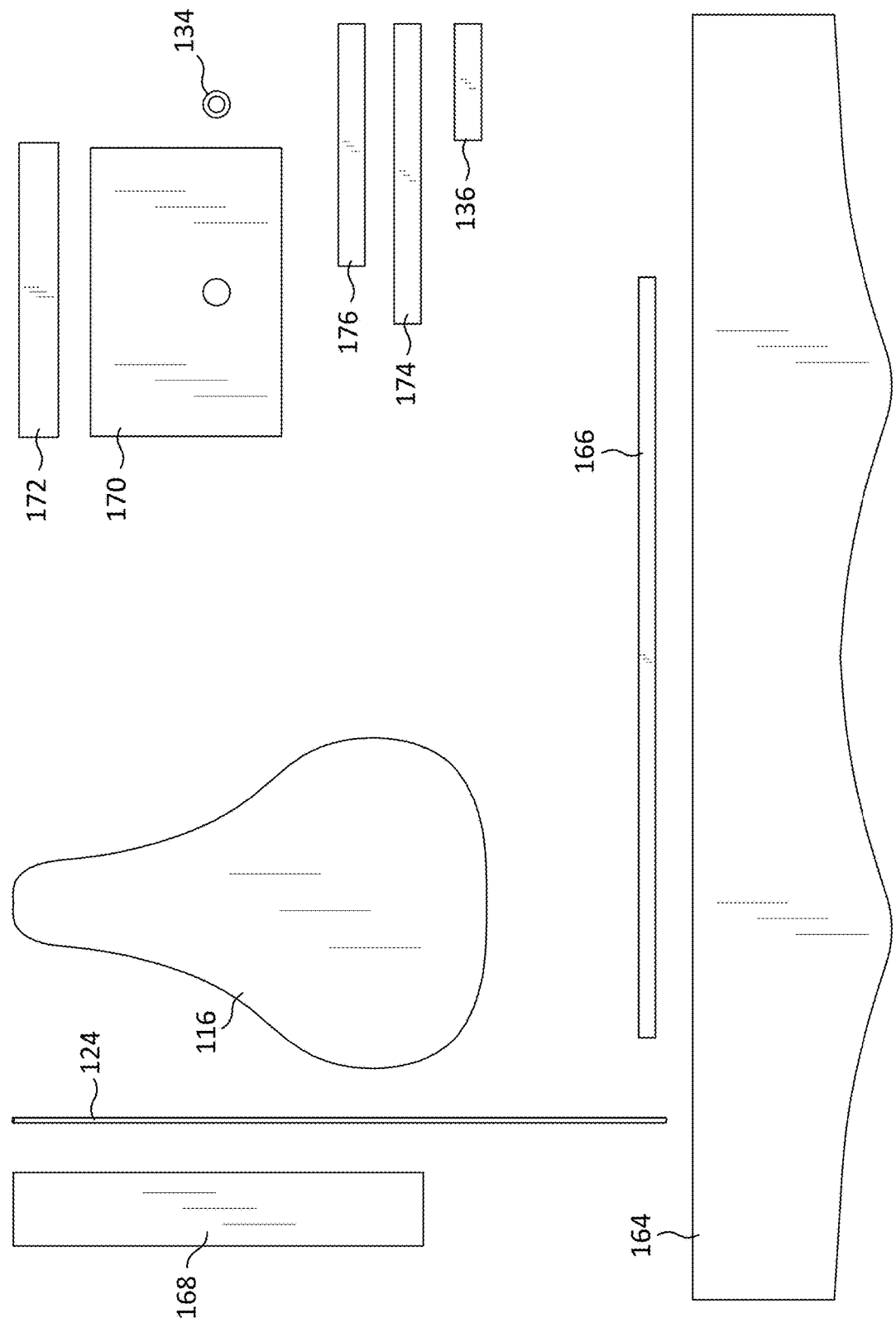
FIG. 11 is a plan view of example components that may be used to implement an embodiment of a retractable cover system according to some of the inventive principles of this patent disclosure.

FIG. 11 is a plan view showing some example pattern shapes that may be used for the components of FIG. 10. The components shown in FIGS. 10 and 11 are not necessarily shown to scale. For purposes of illustration the embodiments shown in FIGS. 3-9 have shapes that are generally suitable for use for a bicycle seat cover, but other shapes may be used according to the inventive principles of this patent disclosure. For example, the cover 116 may be formed in shapes that are adapted to cover seats for outdoor benches or vehicles of all types, as well as optic scopes such as spotting scopes for watching wildlife, aiming scopes for hunting rifles, etc., and any other indoor and/or outdoor gear that may need to be protected from environmental elements.

Since the inventive principles of this patent disclosure can be modified in arrangement and detail without departing from the inventive concepts, such changes and modifications are considered to fall within the scope of the following claims.

The invention claimed is:

1. A retractable cover system comprising:
    a cover adapted to cover an object, wherein the cover includes a retraction channel affixed onto the interior of the cover;
    a storage sleeve, which includes a first opening, an interior, an exterior, and a second opening, the interior of the storage sleeve arranged to receive the cover when not in use; and
    a retraction cord coupled between the cover and the storage sleeve and arranged to move within the retraction channel and to pass through the first opening of the storage sleeve, the interior of the storage sleeve, and the second opening of the storage sleeve.

2. The system of claim 1 wherein the retraction channel is arranged to collapse the cover in response to pulling the retraction cord.

3. The system of claim 2 wherein the cover, retraction channel and storage sleeve are arranged to gather the cover as the cover is pulled into the interior of the storage sleeve by the retraction cord.

4. The system of claim 1 wherein the retraction channel has a first end that is open to receive the retraction cord and a second end opposite the first end.

5. The system of claim 4 wherein the retraction cord has a first end that is attached to the interior of the cover at or near the second end of the retraction channel.

6. The system of claim 5, wherein the second opening of the storage sleeve includes a grommet.

7. The system of claim 1 wherein:
    the retraction cord has a first end that is attached to the interior of the cover at or near the second end of the retraction channel; and
    the retraction cord has a second end that is attached to the storage sleeve.

8. The system of claim 1 further comprising a tab arranged to slide along the retraction cord, wherein the tab secures the retraction cord when the tab is wedged between a bicycle seat saddle and a bicycle seat support bracket.

9. The system of claim 1 wherein the exterior of the storage sleeve is adapted with one or more straps which allow the storage sleeve to be affixed to a a segment of a bicycle seat in proximity to the object to be covered by the cover, wherein
    the one or more straps are comprised of bands of hook-and-loop fasteners, and
    the one or more straps include an inner portion attached directly to the exterior of the storage sleeve and an outer portion which wraps around the segment of the bicycle seat and connects to the inner portion of the one or more straps.

10. The system of claim 9, wherein the cover includes a cinchable hem along the sides and back of the cover to hold the cover in place over the bicycle seat.

11. The system of claim 9, wherein the cover is fabricated from a fabric consisting of nylon, polyester, TPU, wool, or oilcloth.

12. The system of claim 1, wherein the retraction cord consists of a material selected from the group of: thread, strap, cable, string, rope, wire, or elastic cord with rubber core and polyester casing.

13. The system of claim 1, wherein the storage sleeve comprises a hydrophobic mesh material assembled to construct a funnel shape.

14. The system of claim 1, wherein the first opening of the storage sleeve includes a rigid, circular finished edge along the first opening to cause the cover to collapse when the cover is pulled through the first opening.

15. The system of claim 1, wherein the retraction channel is formed by folding the edges of a piece of channel material and stitching the edges to the interior of the cover.

16. A method comprising:
    removing a cover from an object;
    pulling the cover into a storage sleeve by pulling a retraction cord aligned within a retraction channel that is attached to the interior of the cover; and
    collapsing the cover as the retraction cord is pulled through the storage sleeve and along the retraction channel on the cover; wherein:
        pulling the retraction cord at an end attached to the storage sleeve causes the retraction cord to:
            pass through a first opening of the storage sleeve;
            move through the interior of the storage sleeve; and
            retract the cover completely into the storage sleeve as the retraction cord passes through the second opening of the storage sleeve.

17. The method of claim 16 further comprising holding the retraction cord out of the way, when the cover is in the storage sleeve, with a tab, wherein the tab slides along the retraction cord and secures the retraction cord when the tab is wedged between a bicycle seat saddle and a bicycle seat support bracket.

18. A system comprising:
    a cover adapted to cover an object;
    a storage sleeve, which includes a first opening, an interior, and a second opening; and a retraction cord aligned within a retraction channel which is affixed onto the interior of the cover, wherein the retraction cord is arranged to pull the cover through the first opening of the storage sleeve and into the storage sleeve; and wherein pulling the cover through the first opening of the storage sleeve and the retraction cord through the second opening causes the retraction cord to move within the retraction channel on the interior of the cover, and further causes the cover to collapse within the storage sleeve to store the cover when not in use.

19. The system of claim 18 wherein the retraction cord collapses the cover by gathering the cover into the storage sleeve, wherein the retraction cord:

passes through the first opening of the storage sleeve;
passes through the body of the storage sleeve; and
passes through the second opening of the storage sleeve.

\* \* \* \* \*